United States Patent
Black et al.

(10) Patent No.: US 7,282,710 B1
(45) Date of Patent: Oct. 16, 2007

(54) SCANNING PROBE MICROSCOPY TIPS COMPOSED OF NANOPARTICLES AND METHODS TO FORM SAME

(75) Inventors: Charles T. Black, White Plains, NY (US); Adam E. Cohen, New York, NY (US); Christopher B. Murray, Ossining, NY (US); Robert L. Sandstrom, Chestnut Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 10/039,635

(22) Filed: Jan. 2, 2002

(51) Int. Cl.
*G01B 7/34* (2006.01)
(52) U.S. Cl. .......................... 250/306; 435/6; 427/256; 428/327; 73/105; 977/924
(58) Field of Classification Search ................ 250/308, 250/306; 73/105; 977/924
See application file for complete search history.

(56) References Cited

U.S. PATENT DOCUMENTS

| | | |
|---|---|---|
| 3,180,835 A | 4/1965 | Peri |
| 3,531,413 A | 9/1970 | Rosensweig |
| 3,814,696 A | 6/1974 | Verdone et al. |
| 3,965,046 A | 6/1976 | Deffeyes |
| 4,006,047 A | 2/1977 | Brummett et al. |
| 4,063,000 A | 12/1977 | Aonuma et al. |
| 4,687,596 A | 8/1987 | Borduz et al. |
| 4,728,591 A | 3/1988 | Clark et al. |
| 4,877,647 A | 10/1989 | Klabunde |
| 4,940,596 A | 7/1990 | Wright |
| 5,147,841 A | 9/1992 | Wilcoxon |
| 5,160,452 A | 11/1992 | Marutsuka et al. |
| 5,240,493 A | 8/1993 | Zhen et al. |

(Continued)

FOREIGN PATENT DOCUMENTS

| | | |
|---|---|---|
| EP | 0 113 281 A1 | 7/1984 |
| EP | 9 469 714 A2 | 12/1991 |
| EP | 0 686 448 A2 | 12/1995 |
| EP | 0 977 212 A2 | 2/2000 |
| WO | WO98/22942 | 5/1998 |

OTHER PUBLICATIONS

D.L. Peng et al., "Characteristic Tunnel-Type Conductivity and Magnetoresistance in a CoO-Coated Monodispersive Co Cluster Assembly", Applied Physics Letters, vol. 74, No. 1, Jan. 4, 1999, pp. 76-78.

(Continued)

*Primary Examiner*—Jack I. Berman
(74) *Attorney, Agent, or Firm*—Gibb & Rahman, LLC; Ido Tuchman, Esq.

(57) ABSTRACT

A structure and method for improving the spatial resolution of a scanning probe microscope (SPM) tip, which has been coated with a layer of chemically-synthesized nanoparticles. The nanoparticles are either single-species or heterogeneous, such that the single-species nanoparticles can be either ferromagnetic, paramagnetic, superparamagnetic, antiferromagnetic, ferrimagnetic, magneto-optic, ferroelectric, piezoelectric, superconducting, semiconducting, magnetically-doped semiconducting, insulating, fluorescent, or chemically catalytic. The layer of nanoparticles is at least two nanoparticles thick, or alternatively, is a single layer of nanoparticles thick, or alternatively, is a single layer of nanoparticles thick and covers only the tip apex portion of the tip, or alternatively, only a single nanoparticle is affixed to the tip apex. Alternatively, the layer of nanoparticles is transformed into an electrically-continuous magnetic film by annealing at a high temperature.

36 Claims, 2 Drawing Sheets

U.S. PATENT DOCUMENTS

| | | | |
|---|---|---|---|
| 5,304,382 | A | 4/1994 | Monzyk |
| 5,491,219 | A | 2/1996 | Mann |
| 5,505,996 | A | 4/1996 | Nagayama |
| 5,580,492 | A | 12/1996 | Bonnemann et al. |
| 5,698,483 | A | 12/1997 | Ong et al. |
| 5,766,764 | A | 6/1998 | Olli et al. |
| 5,824,409 | A | 10/1998 | Sellmyer et al. |
| 5,843,569 | A | 12/1998 | Kaitsu et al. |
| 5,914,361 | A | 6/1999 | Inui et al. |
| 6,025,202 | A * | 2/2000 | Natan ..................... 436/104 |
| 6,162,532 | A | 12/2000 | Black et al. |
| 6,262,129 | B1 | 7/2001 | Murray et al. |
| 6,361,161 | B1 * | 3/2002 | Anstadt et al. ............ 347/100 |
| 6,508,979 | B1 * | 1/2003 | Requicha et al. ............. 419/7 |
| 6,762,025 | B2 * | 7/2004 | Cubicciotti ................... 435/6 |
| 6,827,979 | B2 * | 12/2004 | Mirkin et al. ............... 427/256 |
| 2002/0034757 | A1 * | 3/2002 | Cubicciotti ................... 435/6 |
| 2002/0063212 | A1 * | 5/2002 | Mirkin et al. ............... 250/306 |
| 2002/0084410 | A1 * | 7/2002 | Colbert et al. ............. 250/306 |
| 2002/0177143 | A1 * | 11/2002 | Mirkin et al. .................. 435/6 |
| 2003/0032192 | A1 * | 2/2003 | Haubold et al. .............. 436/56 |
| 2003/0106998 | A1 * | 6/2003 | Colbert et al. ............. 250/306 |
| 2004/0131843 | A1 * | 7/2004 | Mirkin et al. ............... 428/327 |

OTHER PUBLICATIONS

Sanker et al., "Spin-Dependent Tunneling in Discontinuous Co-SiO2 Magnetic Tunnel Junction", Applied Physics Letter vol. 73, No. 4, Jul. 27, 1998, pp. 535-537.

Toshima, et al., "Polymer-protected Palladium-Platinum Bimetallic Clusters: Preparation, Catalytic Properties adn Structural Considerations", Chem. Soc. Faraday Trans., 1993, 89(14), pp. 2537-2543.

Murray, et al., "Self-Organization of CdSe Nanocrystallites into Three-Dimensional Quantum Dot Superlattices", SCIENCE. vol. 270, Nov. 24, 1995, pp. 1335-1338.

Toyoharu Hayashi, "Catalytic Applications of Gas Evaporated Ultra-Fine Particles", Ultra-Fine Particles: Exploratory Science and Technology, Noyes Publications, 1997, pp. 355-368.

Schaadt et al., "Characterization and Analysis of a Novel Hybrid Magnetoelectronic Device for Magnetic Field Sensing", J. Vac. Sci. Technol., vol. 18, No. 4, Jul./Aug. 2000, pp. 1834-1837.

Inomata et al., "Spin-Dependent Tunneling Through Layered Ferromagnetic Nanoparticles", Applied Physics Letters, vol. 73, No. 8, Aug. 24, 1998, pp. 1143-1145.

Gerber et al., "Magnetoresistance of Granular Ferromagnet—Insulator Films", Thin Solid Films 304 (1997) pp. 319-322.

Kechrakos et al., "Scaling Behavior of the Giant Magnetoresistance of Magnetic Aggregates", Physical Review B, vol. 63, pp. 13442-1-13442-5.

Moodera et al., Ferromagnetic-Insulator-Ferromagnetic Tunneling: Spin-Dependent Tunneling adn Large Magnetoresistance in Trilayer Junctions (Invited), J. Appl. Phys. 79 (8), Apr. 15, 1996, pp. 4724-4729.

Sun et al., "Controlled Assembly of Monodisperse E-Cobalt-Based Nanocrystals", Mat. Res. Soc. Symp. Proc. vol. 577, 1999 Materials Research Society, pp. 385-398.

Shouheng Sun Murry, C.B., Synthesis of Monodisperse Cobalt Nanocrystals and their Assembly into Magentic Superlattices (Invited), J. Appl. Phys. (USA), vol. 85, No. 8, Apr. 15, 1999, pp. 4325-4330.

Black et al., "Spin Dependent Tunneling in Self Assembled Cobalt Nanocrystal Superlattices", Science (USA) vol. 290, No. 290, No. 5494, Nov. 2000, pp. 1131-1134.

Li, et al., "Magnetic Recording in FePt and FePtB Intermetallic Compound Media", IEEE Transactions on Magnetics, vol. 35, No. 2, Mar. 1999, pp. 1077-1082.

Kuo, et al., "Microstructure and magnetic properties of Fe Pt alloy films", Journal of Applied Physics, vol. 85, No. 4, Feb. 15, 1999, pp. 2264-2269.

Cebollada, et al., "Enhanced magneto-optical Kerr effect in spontaneously ordered FePt alloys: Quantitative agreement between theory and experiment", Physical Review B, vol. 50, No. 5, Aug. 1, 1994-1, pp. 3419-3421.

* cited by examiner

SCANNING PROBE MICROSCOPY TIPS COMPOSED OF NANOPARTICLES AND METHODS TO FORM SAME

BACKGROUND OF THE INVENTION

1. Field of the Invention

The present invention generally relates to scanning probe microscopy (SPM) and more particularly to a scanning probe microscope tip with improved spatial resolution using chemically-synthesized nanoparticles.

2. Description of the Related Art

In scanning probe microscopy, specimens are imaged by scanning a sharp probe tip in close proximity to the specimen surface. Data acquired from the probe tip is plotted as a function of the location of the probe tip in the plane of the specimen surface.

Magnetic force microscopy is one of numerous scanning probe microscopy (SPM) techniques. Magnetic force microscopy is a probe to image magnetic fields in magnetic thin films. In the past, spatial resolution of magnetic details of approximately 10 nm has been achieved. Therefore, using a magnetic force microscope (MFM) is an effective tool to measure small magnetic fields arising from submicrometer scaled features.

The class of scanning probe microscopes further includes scanning tunneling microscopes (STM), near-field scanning optical microscopes (NSOM), scanning electrochemical microscopes (SECM) and atomic force microscopes (AFM). AFMs can observe the surface configuration of an insulating sample on an atomic scale.

The MFM consists of an AFM with a probe that contains a magnetic material. In a typical MFM system, a sharp magnetic tip is mounted on a cantilever force sensor. The tip is placed over a magnetic specimen at a separation of 10 nm to 500 nm from the surface of the specimen. Piezoelectric elements, capable of producing displacements as small as 0.01 nm, are used for positional control of the tip or specimen in any direction. The magnetic forces that act on the probe tip from the specimen cause a static deflection of the cantilever. This deflection is monitored by use of a laser detection system, for example, whereby the static deflection of the cantilever causes a corresponding displacement of a reflected laser light beam.

The scanning probe microscopy image is a composite of the effects of all the forces acting on the probe tip. In the absence of other field gradients, long-range Van der Waals forces attract the probe tip to the specimen surface and can be used to generate a topographic image of the surface of the specimen. Moreover, magnetic field gradients can be imaged if the probe tip has a sufficient magnetic dipole moment. The image may show only the magnetic field effects, a superposition of magnetic and topographic effects, or only topography, depending on the relative strength of the magnetic field and Van der Waals gradients as well as the material characteristics of the magnetic probe tip.

The material properties of the probe tip contribute to the increase or decrease in spatial resolution of an MFM. Various materials have been used for the magnetic probe tip in MFM. For example, use of a magnetized iron tip is described by Martin et al., "High-resolution Magnetic Imaging of Domains in TbFe by Force Microscopy", Appl. Phys. Lett., Vol. 52, No. 3, Jan. 18, 1988, pp. 244-246. Also, the use of silicon tips coated with a film of magnetic material, such as NiFe or CoPtCr, in MFM is described by Grutter et al., "Magnetic Force Microscopy with Batch-fabricated Force Sensors", J. Appl. Phys., Vol. 69, No. 8, Apr. 15, 1991, pp. 5883-5885. The standard method for forming an MFM sensor is to coat a standard AFM tip with magnetic material using standard thin-film deposition methods such as evaporation or sputtering. MFM sensors fabricated in this manner are limited in resolution by two main factors: 1) the film thickness of the magnetic coating layer increases the tip radius-of-curvature, thus decreasing resolution; and 2) the size of the magnetic domains in such a continuous thin-film also limits the resolution. Various methods have been attempted in an effort to overcome these problems. Patterning of the magnetic film deposited on the AFM tip can be done by ion-milling (S. H. Liou, IEEE Transactions on Magnetics, 35, 3989 (1999)). Alternatively, electron-beam lithography combined with shadow-evaporation of thin-films can produce regions of magnetic materials confined to the tip apex (G. D. Skidmore and E. D. Dahlberg, *Applied Physics Letters* 71, 3295 (1997), S. Y. Chou, S. Wei., P. Fischer, *IEEE Transactions on Magnetics* 30, 4485, (1994), M. Ruhrig et al., *J. Appl. Phys.* 79, 2913 (1996)). Both of these techniques are quite labor-intensive and are difficult to implement in a parallel manner.

Nanoparticles with diameters ranging from 2 nm to 20 nm can be made out of a wide variety of organic and inorganic materials (C. B. Murray, D. J. Norris, M. G. Bawendi, *J. Am. Chem. Soc.* 115, 8706 (1993), L. Brus in "Materials Chemistry: An Energy Discipline," G. A. Ozin ed., 335 (ACS Sympos. Ser. No. 245, 1995)). Nanocrystals are a subclass of nanoparticles composed of well-characterized, crystalline cores and thin organic coats. Nanocrystals are monodisperse in terms of their size, internal structure (lattice), surface chemistry, and shape. Nanoparticles dispersed in liquids and nanoparticles deposited on solid substrates have provided much information on the submicroscopic properties of materials (A. P. Alivisatos, *Science* 271, 933 (1996)). Nanoparticles, and more specifically nanocrystals, attached to SPM tips could provide probes sensitive to a wide range of physical and chemical properties of a specimen, on a nanometer length-scale.

However, nanoparticles have not been used in SPM before because there did not exist a good method for attaching nanoparticles to SPM tips. Furthermore, magnetic nanoparticles have not been used in MFM before because, until recently, high-quality magnetic nanoparticles were unavailable (S. H. Sun, C. B. Murray, D. Weller, L. Folks, A. Moser, *Science* 287, 1989 (2000)). Thus, there is a need for an improvement in the spatial resolution of a scanning probe microscope using a new material composition for constructing the probe tip.

SUMMARY OF THE INVENTION

In view of the foregoing and other problems, disadvantages, and drawbacks of the conventional material compositions of the probe tips of scanning probe microscopes, the present invention has been devised, and it is an object of the present invention to provide a structure and method to improve the spatial resolution of a scanning probe microscope.

In order to attain the object suggested above, there is provided, according to one aspect of the invention a structure and method for improving the spatial resolution of a magnetic force microscope (MFM) tip, which has been coated with a layer of chemically-synthesized nanoparticles. The nanoparticles may be either single-species or heterogeneous, such that the single-species nanoparticles may be either ferromagnetic, paramagnetic, superparamagnetic, antiferromagnetic or ferrimagnetic. A heterogeneous coating may contain nanoparticles of one or more sizes and may comprise a mixture of one or more of the above-mentioned types of nanoparticles, or nanoparticles with one or more types of organic coats. The layer of nanoparticles is at least two nanoparticles thick, or alternatively, is a single layer of nanoparticles thick, or alternatively, is a single layer of nanoparticles thick and covers only the apex portion of the tip, or alternatively, only a single nanoparticle is affixed to the tip apex. Additionally, the layer of nanoparticles may be annealed at a high temperature to change the crystal structure of the nanoparticles, or to strengthen the adhesion of the nanoparticles to the tip, or to orient uniformly the magnetic axes of ferromagnetic nanoparticles.

The present invention relates to the general process of affixing nanoparticles to the tip of a scanning probe microscope, and need not be limited to magnetic nanocrystals. Nanoparticles comprised of magneto-optic, ferroelectric, piezoelectric, superconducting, semiconducting, magnetically-doped semiconducting, insulating, fluorescent, or chemically catalytic materials may be affixed to SPM tips in the manner described herewith.

The method of forming the scanning probe microscope tip comprises coating a scanning probe microscope tip with an adhesion promoter; dipping the tip through a layer of nanoparticles floating on a liquid subphase; and withdrawing the tip from the liquid subphase. Other methods of forming the scanning probe microscope tip include inking an elastomeric stamp with nanoparticles on it, and sticking the microscope tip into the elastomer; submerging the tip into a solution of dispersed nanoparticles; and using electrostatic and electrochemical methods to attach the nanoparticles to the tip; and finally using lithographic techniques to attach the nanoparticles to the tip. After the nanoparticles have been affixed to the tip, chemical and physical treatments may be applied to the tip to impart to it desired properties. Heat, laser light, or a beam of electrons may be applied to the tip to strengthen the adhesion between the nanoparticles and the tip.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

As mentioned above, there is a need for a scanning probe microscope with improved spatial resolution. In order to increase the spatial resolution, the invention forms the microscope probe tip using chemically synthesized nanoparticles. The advantage conferred by a tip coated with chemically synthesized nanoparticles is that the region on the tip that interacts with the substrate is limited to a few nanoparticles. For a tip coated with magnetic nanoparticles, this region is much smaller than the interaction-region on MFM tips fabricated by conventional processes. The smaller interaction-region leads to higher spatial resolution.

Figure 1A:
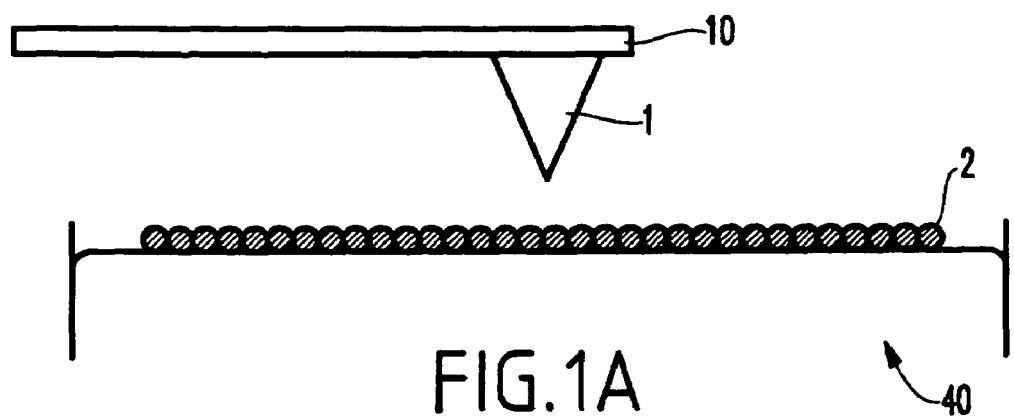
FIG. 1(a) is a schematic diagram of a method of coating an SPM tip.
Figure 1B:
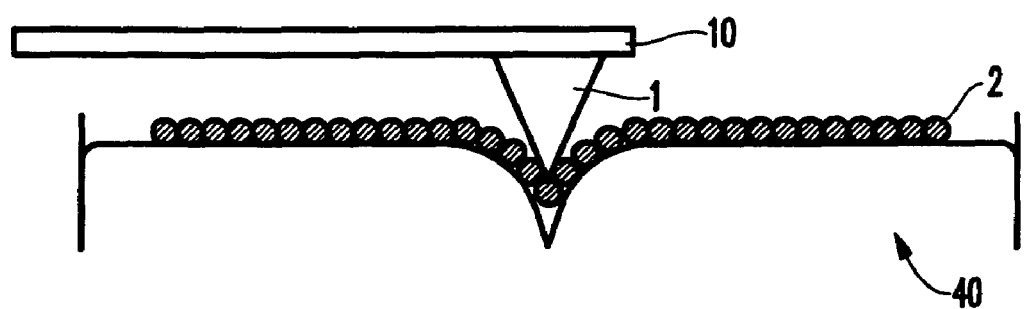
FIG. 1(b) is a schematic diagram of a method of coating an SPM tip.
Figure 1C:
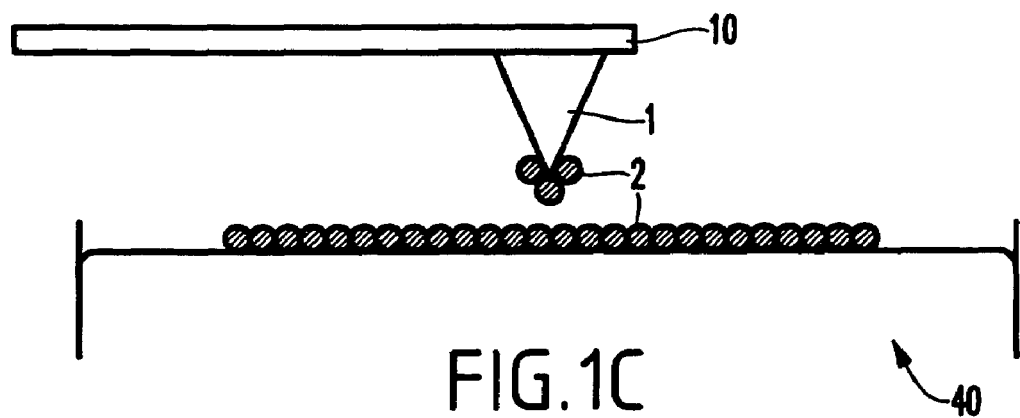
FIG. 1(c) is a schematic diagram of a method of coating an SPM tip.

In a preferred embodiment of the present invention, the process of coating the tip is shown in sequence in FIGS. 1(a), 1(b), and 1(c). FIG. 1 is not drawn to scale; wherein nanoparticles have a typical diameter of 2 nm-20 nm; the tip apex has a typical diameter of 20 nm-50 nm; and the tip has a typical height of 10 µm-30 µm. A nonmagnetic silicon AFM tip 1 is shown attached to a cantilever 10. The tip 1 is coated with a molecular layer of an adhesion-promoting chemical, n-(2-aminoethyl)3-aminopropyl-trimethoxysilane, by dipping the tip into n-(2-aminoethyl)3-aminopropyl-trimethoxysilane and then rinsing off the excess n-(2-aminoethyl)3-aminopropyl-trimethoxysilane with ethanol. Other adhesion layers include polyethylineimine, polymethylmethacrylate, epoxy, cyanoacrylate adhesive, and an $\alpha,\omega$ alkyl chain, wherein each functional group is selected from one of an amine, carboxylic acid, isocyanide, nitrile, phosphene, phosphonic acid, sulfonic acid, thiol, and trichlorosilane. The nanoparticles 2 are comprised of 8 nm-diameter grains of cobalt, coated with a single molecular layer of oleic acid. The variability in the diameter of the nanoparticles 2 is less than 5%. A two-dimensional layer of magnetic nanoparticles 2, supported on a water subphase 40, is formed via a Langmuir-Blodgett (LB) technique, whereby a drop of solvent (e.g., hexane) containing nanoparticles is deposited onto the surface of the water subphase 40. After the solvent evaporates, surface tension confines a two-dimensional layer of nanoparticles 2 to the water-air interface. A moveable barrier compresses the layer to form a closely-packed, ordered monolayer of nanoparticles 2. The tip 1 is dipped through the nanoparticles 2 into the water 40. Upon removal of the tip 1 from the water 40, some of the nanoparticles 2 attach themselves to the tip 1. The preferred embodiment described above can be varied in a number of obvious ways to create useful SPM tips.

The tip 1 need not be for MFM, but may also be for AFM, STM, SECM, NSOM, or for any other SPM technique. The tip 1, or alternatively just the apex 5 of the tip 1, may be coated with any of a wide range of adhesion-promoters prior to the deposition of nanoparticles 2 onto the tip 1. Possible adhesion promoters include: n-(2-aminoethyl)3-aminopropyl-trimethoxysilane, polyethylineimine, carboxylate-terminated trichlorosilane self-assembled monolayers, thin coatings of photo-cured adhesives, epoxies, and cyancrylate adhesives.

The tip 1 may be coated with a large variety of nanoparticles 2 that have been designed to have a useful property. Useful properties include, but are not limited to: ferromagnetism, paramagnetism, superparamagnetism, antiferromagnetism, ferrimagnetism, magneto optic response, ferroelectric effects, piezoelectric effects, superconductivity, semiconductivity, magnetically-doped semiconductivity, electrical insulation, fluorescence, and chemical catalysis. In addition, the nanoparticle itself may be a composite material comprising materials with different properties.

The nanoparticles 2 can have precisely-controlled sizes ranging from as small as 2 nm up to 20 nm, depending on the application. Well-established chemical syntheses allow the creation of nanoparticles where the variability in the diameter of the nanoparticles is less than 15% of their diameter, and preferably less than 10% of their diameter. Preferably, the present invention uses nanoparticles 2 with a variability less than 5% of their diameter.

Furthermore, any of a large class of organic coats may be applied to the nanoparticles to produce a coating with a thickness between 0.5 nm and 5 nm. The organic coat comprises one or more types of molecules, where each molecule contains a head-group that binds to the nanoparticle and a tail-group that extends away from the nanoparticle. The head-group may be selected from one of an amine, carboxylic acid, isocyanide, nitrile, phosphene, phosphonic acid, sulfonic acid, thiol, and trichlorosilane. The tail-group may be selected from one of an alkyl chain, aryl chain, fluorocarbon, siloxane, fluorophore, DNA, carbohydrate, and protein.

As illustrated in FIG. 2(*c*) a mixed coating comprised of nanoparticles 2, 4 with two or more compositions, sizes, or organic coatings may be formed. Either a mixed layer of nanoparticles 2, 4 is deposited on the subphase, or the tip is processed two or more times to deposit multiple layers of different types of nanoparticles 2, 4. FIG. 2(*a*) shows an adhesion promoter 6 deposited on the entire tip 1, including the tip apex 5. Moreover, FIG. 2(*g*) illustrates a single nanoparticle 2 with an organic coating 3 encapsulating the nanoparticle 2.

Nanoparticles 2 may be deposited over the entire tip 1 in one layer as in FIG. 2(*d*) or in multiple layers as in FIG. 2(*b*). Alternatively, nanoparticles 2 may be deposited only over the apex 5 of the tip 1 in order to achieve higher spatial resolution, as in FIG. 2(*e*). Alternatively, just a single nanoparticle 2 may be deposited on the apex 5 of the tip 1, as in FIG. 2(*f*).

After the deposition of nanoparticles 2, the tip 1 may be treated to promote the adhesion of nanoparticles 2 to the tip. Possible post-deposition treatments include exposure to ultraviolet light, intense coherent light, or a beam of electrons.

Alternatively, the nanoparticles 2 may be annealed at a high temperature. In addition to promoting adhesion of the nanoparticles 2 to the tip 1, the annealing step may be used to fuse the nanoparticles 2 into an electrically-continuous film. Furthermore, a magnetic field may be applied to ferromagnetic nanoparticles 2 during an annealing step to orient uniformly the magnetic axes of all the nanoparticles 2. For ferroelectric nanoparticles, an electric field may be applied during an annealing step to orient uniformly the electric polarization axes of all the nanoparticles.

The tip 1 can be fabricated using several alternative approaches. In a first approach, the tip 1 is dipped onto a liquid subphase 40. In this technique single-layer films of nanoparticles can be formed by depositing a drop of spreading solvent (e.g. hexane, toluene, heptane, pentane, chloroform, dichloromethane) containing nanoparticles onto the surface of a liquid subphase. The liquid subphase may be water, ethylene glycol, propylene glycol, or mixtures thereof. Surfactants such as sodium octanesulfonate may be added to the subphase to improve the uniformity of the layer of nanoparticles. After the solvent evaporates, surface tension confines the nanoparticles to the subphase-air interface, resulting in a two-dimensional film results. Using standard LB techniques, the film can be compressed to form a closely-packed, ordered monolayer film of nanoparticles. Dipping the tip into the liquid subphase, and then retracting it, causes the nanoparticle monolayer to be transferred onto the tip. Furthermore, dipping the tip in this method is done such that the tip is not fully submerged into the liquid solution, rather it is dipped into the upper floating monolayer of nanoparticles, which are floating on the liquid solution.

Dipping the tip 1 has the potential to coat the entire tip 1 with nanoparticles 2. This may be adequate for some applications as will be addressed. Furthermore, dipping in this manner makes the process easy scalable, such that an entire wafer of SPM tips may be dipped in one step.

The second approach provides for dipping a flat sheet of an elastomer (such as polydimethylsiloxane (PDMS)) into a liquid subphase 40 on which floats a layer of nanoparticles, such that a monolayer of nanoparticles adheres to the surface of the elastomer. The tip 1 is then brought into contact with a region of the elastomer that has been coated with nanoparticles and the nanoparticles transfer from the elastomer to the tip. This method allows for better control of the dip depth than can be achieved by dipping the tip directly into the liquid subphase, and the possibility of mounting a single nanoparticle 2 on the tip 1. Using this method, it is possible to use a laser beam to monitor the tip-elastomer separation, and therefore control very precisely the dip depth of SPM tip into the elastomer.

However, this need for monitoring the precise position of the tip also makes it more difficult to parallelize than by direct deposition from the liquid subphase 40. Although more precise, this approach requires careful monitoring of each individual tip coating. It is therefore not amenable to batch processing of many tips in parallel.

The third method allows for dipping the tip 1 onto a monolayer of nanoparticles floating on a thin liquid layer comprised of a nonvolatile liquid, such as ethylene glycol, propylene glycol, photoresist, or paraffin. This method has the advantage of dipping into a liquid subphase that is easy to remove from the tip 1 after the deposition of nanoparticles is complete.

The third method is essentially a combination of dipping directly from a liquid subphase (method 1) and coating from an elastomer (method 2). By creating a nanoparticle monolayer on a liquid subphase (similar to method 1) that is extremely thin, it is possible to use the laser-based techniques of method 2 to control the depth to which the tip is dipped into the nanoparticles. In addition, by dipping the tip into liquid it is possible to minimize the damage to the SPM tip by bringing it into contact with solids (elastomers, in method 2).

Also, the surface tension may limit the minimum area on the tip 1 that is coated with nanoparticles 2. If the liquid wets the tip, then capillary action will draw the liquid and the nanoparticles up the tip. When the tip is withdrawn, it will be coated with nanoparticles wherever the liquid contacted it.

In the fourth method, the tip 1 is dipped (submerged) into a thin layer of a solution of the nanoparticles in a nonvolatile solvent. Nanoparticles randomly diffusing in the solvent will come into contact with the tip. Provided that the nanoparticles stick to the tip, a monolayer of particles will form on the tip. Then, the solvent is washed off. The fourth method has the advantage over the third method in that it is not necessary to form a closely-packed monolayer of nanoparticles on the surface of the liquid; a possibly challenging task.

Once again, the surface tension may limit the minimum area on the tip 1 that is coated with nanoparticles 2. As in the third approach, the wetting behavior of the liquid on the tip may affect the extent to which the tip is coated with nanoparticles.

In a fifth method, an electric potential is applied to the tip 1 in an electrochemical solution of nanoparticles (with a supporting electrolyte). Electric fields emanating from the tip may attract nanoparticles and cause them to stick to the apex of the tip 1. The electrochemical solution comprises nanoparticles, a solvent, and an electrode held at a neutral potential. Furthermore, the electrochemical solution comprises a supporting electrolyte and a reference electrode.

A sixth method involves performing a variant of the "liftoff" technique used in semiconductor processing on the tip 1. The entire tip 1 is coated with a soft sacrificial layer. Possible materials for the sacrificial layer are: photoresist, paraffin, or nail polish. Then the tip 1 is scanned in contact against a hard substrate to abrade and remove the sacrificial layer from the apex 5. Thus, all but the apex 5 of the tip 1 is coated with a sacrificial layer. Nanoparticles 2 are deposited over the apex 5 and the sacrificial layer, and then the sacrificial layer is removed. The liftoff process leaves nanoparticles 2 only at the apex 5.

In all of the above approaches, the scanning probe microscope tip can be treated after deposition of the nanoparticles through heat treatment, exposure to ultraviolet light, exposure to an electron-beam, or exposure to a laser light. In the heat treatment process, the tip can be heated to melt the nanoparticles to form a continuous film, or alternatively, the tip can be heat treated to form an alloy from a heterogeneous nanoparticle coating. Similarly, the tip can be heat treated in a magnetic field to orient uniformly the magnetic moments of ferromagnetic nanoparticles, or the tip can be heat treated to cause a chemical reaction between heterogeneous nanoparticles.

Figure 2A:
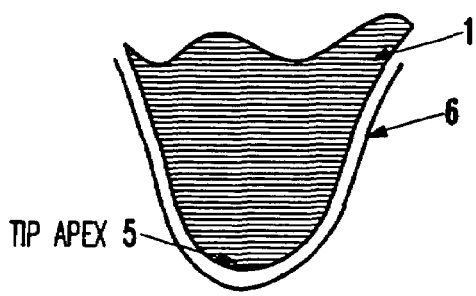
FIG. 2(a) is a schematic diagram of an SPM tip structure.
Figure 2B:
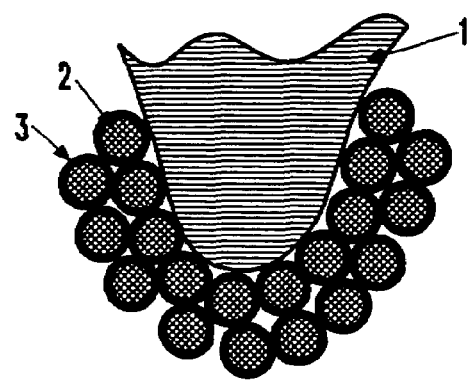
FIG. 2(b) is a schematic diagram of an SPM tip structure.
Figure 2C:
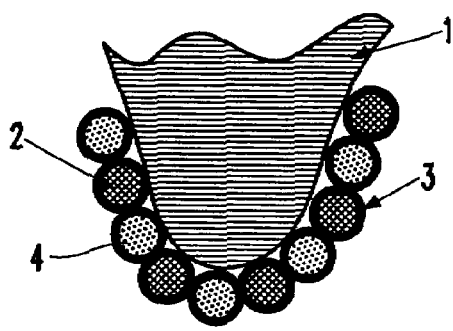
FIG. 2(c) is a schematic diagram of an SPM tip structure.
Figure 2D:
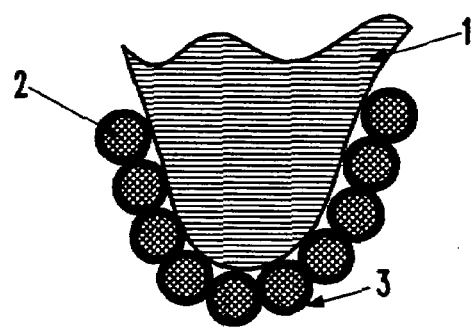
FIG. 2(d) is a schematic diagram of an SPM tip structure.
Figure 2E:
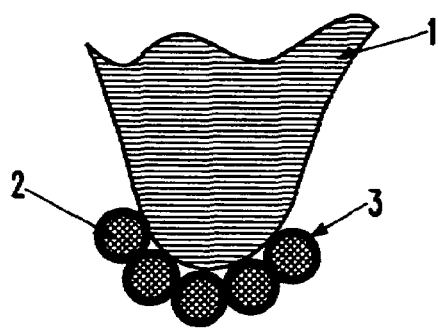
FIG. 2(e) is a schematic diagram of an SPM tip structure.
Figure 2F:
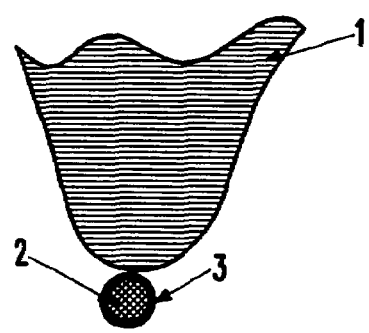
FIG. 2(f) is a schematic diagram of an SPM tip structure.
Figure 2G:
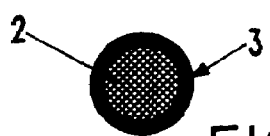
FIG. 2(g) is a schematic diagram of a nanoparticle structure.

There are several applications which can employ scanning probe tips that have been coated with nanoparticles. First, in magnetics, the present invention aids in performing magnetic force microscopy (MFM). To achieve high resolution, an MFM tip should maximize the amount of magnetic material near the specimen and minimize the amount of magnetic material far from the specimen. This goal is achieved in an MFM tip with a single nanoparticle at the apex, similar to the illustration in FIG. 2(f). The nanoparticles may be either ferromagnetic or superparamagnetic. Also, MFM may be performed with a coating of ferromagnetic or superparamagnetic nanoparticles that extends up the tip as shown in FIGS. 2(c), 2(d) and 2(e). This extended coating is easier to make than a single-nanoparticle tip because it does not require fine control over the deposition process, and yet still provides higher resolution than does a solid conical tip.

A tip coated with one or more ferromagnetic nanoparticles may be annealed in the presence of a magnetic field at a temperature above the Curie temperature, to align the magnetic axes of the nanoparticles. Superparamagnetic or uniformly oriented ferromagnetic nanoparticles are superior to MFM with a solid magnetic tip because the number of interacting spins grows only linearly with the tip radius as one extends away from the specimen. In a solid conical tip, the number of interacting spins grows proportionally to the square of the tip radius. A tip coated with randomly oriented (un-annealed) ferromagnetic nanoparticles may provide higher resolution than an annealed tip. The magnetic forces on nanoparticles far from the apex will average to zero because each nanoparticle may be associated with an oppositely oriented nanoparticle at the same distance from the sample. Only the forces on those nanoparticle(s) at the apex will remain unbalanced.

In a second application, the invention is used in scanning tunneling spectroscopy, wherein a metallic nanoparticle is mounted on a conductive tip and a tunneling current passes from the tip through the nanoparticle to the specimen. Electrons passing through the nanoparticle will not have the continuous distribution of energy levels that are found in a bulk metal. Rather, the electronic energies will be restricted to discrete values. The dependence of the current through the nanoparticle on the potential applied to the nanoparticle will provide information on the electronic band-structure of the specimen immediately under the nanoparticle. This information is difficult to obtain with a tip that has not been coated with nanoparticles.

In a third application, fluorescent nanoparticles are placed on a silicon tip. Then, the tip is illuminated with ultraviolet light and the fluorescence from the nanoparticles is detected as the tip is scanned over a specimen. The nanoparticles act as a light source with an aperture size equal to the diameter of a nanoparticle, which is far below the wavelength of light emitted by the nanoparticles. The fluorescent light can be used in the near-field to create optical images of the specimen with a resolution in the order of the diameter of a nanoparticle. Furthermore, a measurement of nonradiative energy transfer from the nanoparticle to the specimen will provide information about optically active compounds on the surface of the specimen. In the above application the silicon tip may be replaced by a sharpened optical fiber, of the sort used in near-field scanning optical microscopy (NSOM), and one or both of the exciting UV light and the fluorescent light may pass through the fiber.

Fourth, in magneto-optics, the invention is useful for imaging magnetic fields if a tip (Si or NSOM) is coated with nanoparticles with strong magneto-optical properties. The tip is scanned over a specimen while the relevant magneto-optical property of the nanoparticle(s) on the tip is measured. Some possible coatings are: materials with large magneto-optic rotation (such as yttrium-iron-garnet, YIG), magnetically-doped fluorescent semiconductors, heterogeneous superlattices of magnetic and nonmagnetic fluorescent nanoparticles (rate of nonradiative energy transfer will depend on the field), and heterogeneous superlattices of magnetic and nonmagnetic metals (degree of electronic delocalization, and hence reflectivity, will depend on the field).

A fifth application of the invention is in catalysis, wherein a catalytically active nanoparticle is mounted on the tip. In a proper chemical environment this nanoparticle is used to localize a reaction to a very small volume. This is useful for high-resolution chemical modification of surfaces or in single-molecule studies.

While the invention has been described in terms of preferred embodiments, those skilled in the art will recognize that the invention can be practiced with modification within the spirit and scope of the appended claims.

What is claimed is:

1. A scanning probe microscope tip consisting of coating said tip with a layer of chemically-synthesized nanoparticles affixed to said tip such that a drop of solvent containing said nanoparticles is deposited onto a surface of a liquid subphase prior to said nanoparticles being affixed to said tip, each of said nanoparticles comprising a length and width, wherein said length differs from said width by less than approximately 15%,
    wherein said each of said nanoparticles comprises an outer coating layer encapsulating each nanoparticle,
    wherein said tip is a non-magnetic silicon AFM tip,
    wherein said tip is coated with an adhesion layer,
    wherein said adhesion layer is between said tip and said nanoparticles,
    wherein said nanoparticles are generally spherical, and
    wherein said solvent comprises any of toluene, heptane, pentane, chloroform, and dichloromethane.

2. The tip of claim 1, wherein said scanning probe microscope tip is one of an atomic force microscope tip, a near-field scanning optical microscope tip, and a scanning tunneling microscope tip.

3. The tip of claim 1, wherein said nanoparticles comprise at least one of an amorphous, crystalline, ferromagnetic, paramagnetic, superparamagnetic, antiferromagnetic, ferrimagnetic, magneto optic, ferroelectric, piezoelectric, superconducting, semiconducting, magnetically-doped semiconducting, insulating, fluorescent, and chemically catalytic nanoparticles.

4. The tip of claim 1, wherein said outer coating layer comprises an organic layer; wherein said nanoparticles having a diameter ranging from 2 nm to 20 nm, and said organic layer having a thickness ranging from 0.5 nm to 5 nm.

5. The tip of claim 1, wherein said outer coating layer comprises an organic coat comprising a head-group and a tail-group;
   Wherein said head group comprises one of an amine, carboxylic acid, isocyanide, nitrile, phosphene, phosphonic acid, sulfonic acid, thiol, and trichlorosilane; and
   wherein said tail-group comprises one of an alkyl chain, aryl chain, fluorocarbon, siloxane, fluorophore, DNA, carbohydrate, and protein.

6. The tip of claim 1, wherein said adhesion layer comprises one of n-(2-aminoethyl)3-aminopropyl-trimethoxysilane, polyethylineimine, polymethylmethacrylate, epoxy, cyanoacrylate adhesive, and an $\alpha,\omega$ alkyl chain.

7. The tip of claim 1, wherein said layer of chemically-synthesized nanoparticles is at least one nanoparticle thick.

8. The tip of claim 1, wherein said layer of chemically-synthesized nanoparticles is a single layer of nanoparticles thick and covers only the apex of said tip.

9. The tip of claim 1, wherein said layer of chemically-synthesized nanoparticles comprises a single nanoparticle affixed to an apex of said tip.

10. A method of forming a scanning probe microscope tip, said method consisting of:
    depositing a solvent containing nanoparticles onto a surface of a liquid solution, wherein said solvent comprises any of toluene, heptane, pentane, chloroform, and dichloromethane;
    wherein the tip is a non-magnetic silicon AFM tip;
    wherein said scanning probe microscope tip is coated with an adhesion promoter;
    wherein said scanning probe microscope tip is first dipped into the liquid solution of nanoparticles and then said scanning probe microscope tip is withdrawn from said liquid solution, each of said nanoparticles comprising a length and a width; and
    wherein said length differs from said width by less than approximately 15%,
    wherein the dipping causes said nanoparticles to become affixed to said scanning probe microscope tip,
    wherein said scanning probe microscope tip comprises a tip apex,
    wherein said each of said nanoparticles comprises an outer coating layer, and
    wherein said nanoparticles are generally spherical.

11. The method of claim 10, wherein said step of dipping said scanning probe microscope tip into a solution of nanoparticles comprises dipping said scanning probe microscope tip into a monolayer of nanoparticles floating on a liquid subphase.

12. The method of claim 10, wherein said step of dipping said scanning probe microscope tip into a solution of nanoparticles comprises inking an elastomer with a plurality of nanoparticles; and dipping said scanning probe microscope tip into said elastomer.

13. The method of claim 10, further comprising washing off said solution after said step of withdrawing said scanning probe microscope tip from said solution, wherein said solution is a nonvolatile solution.

14. The method of claim 10, further comprising applying an electric potential to said scanning probe microscope tip prior to said step of dipping said scanning probe microscope tip into a solution of nanoparticles.

15. The method of claim 14, wherein said solution further comprises an electrochemical solution, a supporting electrolyte, and an electrode held at a neutral potential.

16. The method of claim 10, wherein said nanoparticles form a layer around said scanning probe microscope tip, wherein said layer is one nanoparticle thick.

17. The method of claim 10, wherein said nanoparticles form a layer around said scanning probe microscope tip, wherein said layer comprises a single layer of nanoparticles and covers only said tip apex.

18. The method of claim 10, wherein only a single nanoparticle is affixed to said tip apex.

19. The method of claim 10, wherein said step of dipping said scanning probe microscope tip into a solution of nanoparticles comprises submerging said tip into said liquid solution.

20. The method of claim 10, wherein said nanoparticles form a layer around said tip, said method further comprising exposing said layer of nanoparticles to one of a laser light, a beam of electrons, ultraviolet light, and heat.

21. The method of claim 10, wherein said nanoparticles form a layer around said tip, said method further comprising transforming said layer of nanoparticles into an electrically continuous film by annealing.

22. The method of claim 10, wherein said nanoparticles form a layer around said tip, said method further comprising orienting uniformly the magnetic axis of said nanoparticles by annealing in the presence of a magnetic field.

23. A method of forming a scanning probe microscope tip, said method consisting of:
    depositing a solvent containing generally spherical nanoparticles onto a surface of a liquid solution, wherein said solvent comprises any of toluene, heptane, pentane, chloroform, and dichloromethane;
    wherein said tip is a non-magnetic silicon AFM tip;
    coating said scanning probe microscope tip, with the exception of an apex of said tip, with a sacrificial adhesion layer;
    affixing the nanoparticles to said tip, wherein said affixing consists of depositing said generally spherical nanoparticles from said liquid solution over said tip, each of said nanoparticles comprising a length and width, said length differs from said width by less than approximately 15%; and
    removing said sacrificial layer,
    wherein said each of said nanoparticles comprises an outer coating layer encapsulating each nanoparticle.

24. A method of forming a scanning probe microscope tip, said method consisting of:
    depositing a solvent containing generally spherical nanoparticles onto a surface of a liquid subphase, wherein said solvent comprises any of toluene, heptane, pentane, chloroform, and dichloromethane;

wherein said tip comprises a non-magnetic silicon AFM tip; coating said scanning probe microscope tip with an adhesion promoter;

affixing the nanoparticles to said tip, wherein said affixing consists of dipping said scanning probe microscope tip into a monolayer of said generally spherical nanoparticles floating on said liquid subphase, each of said nanoparticles comprising a length and width, said length differs from said width by less than approximately 15%; and withdrawing said scanning probe microscope tip from said liquid subphase;

wherein said scanning probe microscope tip comprises a tip apex, and wherein said each of said nanoparticles comprises an outer coating layer encapsulating each nanoparticle.

25. A method of forming a scanning probe microscope tip, said method consisting of:

depositing a solvent containing generally spherical nanoparticles onto a surface of a liquid subphase, wherein said solvent comprises any of toluene, heptane, pentane, chloroform, and dichloromethane;

wherein said tip is a non-magnetic silicon AFM tip;

inking an elastomer with a plurality of said generally spherical nanoparticles, each of said nanoparticles comprising a length and width, said length differs from said width by less than approximately 15%;

coating said scanning probe microscope tip with an adhesion promoter;

affixing the nanoparticles to said tip, wherein said affixing consists of dipping said scanning probe microscope tip into said elastomer; and withdrawing said scanning probe microscope tip from said elastomer;

wherein said scanning probe microscope tip comprises a tip apex, and wherein said each of said nanoparticles comprises an outer coating layer encapsulating each nanoparticle.

26. A method of forming a scanning probe microscope tip, said method consisting of:

depositing a solvent containing generally spherical nanoparticles onto a surface of a liquid solution, wherein said solvent comprises any of toluene, heptane, pentane, chloroform, and dichloromethane;

wherein said tip is a non-magnetic silicon AFM tip;

coating said scanning probe microscope tip with an adhesion promoter;

affixing the nanoparticles to said tip, wherein said affixing consists of dipping said scanning probe microscope tip into said liquid solution, wherein said liquid solution is nonvolatile and further comprises a plurality of said generally spherical nanoparticles dispersed therein, each of said nanoparticles comprising a length and width, said length differs from said width by less than approximately 15%;

withdrawing said scanning probe microscope tip from said liquid solution; and washing off said liquid solution, whereby said nanoparticles remain on said scanning probe microscope tip, wherein said scanning probe microscope tip comprises a tip apex, and wherein said each of said nanoparticles comprises an outer coating layer encapsulating each nanoparticle.

27. A method of forming a scanning probe microscope tip, said method consisting of:

depositing a solvent containing generally spherical nanoparticles onto a surface of an electrochemical liquid solution, wherein said solvent comprises any of, toluene, heptane, pentane, chloroform, and dichloromethane:

wherein said tip is a non-magnetic silicon AFM tip;

coating said scanning probe microscope tip with an adhesion promoter;

affixing the nanoparticles to said tip, wherein said affixing consists of dipping said scanning probe microscope tip into the electrochemical solution, wherein said electrochemical solution comprises an electrode held at a neutral potential, each of said nanoparticles comprising a length and width, said length differs from said width by less than approximately 15%;

applying an electric potential to said scanning probe microscope tip; and withdrawing said scanning probe microscope tip from said electrochemical solution;

wherein said scanning probe microscope tip comprises a tip apex, and wherein said each of said nanoparticles comprises an outer coating layer encapsulating each nanoparticle.

28. The method of claim 27, wherein said electrochemical solution further comprises a supporting electrolyte and a reference electrode.

29. The tip of claim 1, wherein said nanoparticles comprise generally spherical cobalt nanoparticles.

30. The tip of claim 1, wherein said outer coating layer comprises a layer of oleic acid.

31. A scanning probe microscope tip consisting of: coating said tip with a layer of chemically-synthesized generally spherical nanoparticles affixed to said tip such that a drop of solvent containing said nanoparticles is deposited onto a surface of a liquid subphase prior to said nanoparticles being affixed to said tip, wherein said solvent comprises any of toluene, heptane, pentane, chloroform, and dichloromethane, wherein said tip comprises a non-magnetic silicon AFM tip;

wherein said nanoparticles are shaped in a configuration other than an elongated tube configuration, wherein each of said nanoparticles comprises an outer coating layer encapsulating each nanoparticle, wherein said scanning probe microscope tip is coated with an adhesion layer, and, wherein said adhesion layer is between said tip and said nanoparticles.

32. A scanning probe microscope tip consisting of: coating said tip with a layer of chemically-synthesized nanoparticles affixed to said tip such that a drop of solvent containing said nanoparticles is deposited onto a surface of a liquid subphase prior to said nanoparticles being affixed to said tip, each of said nanoparticles comprising a length and width, wherein said length differs from said width by less than approximately 15%, wherein said tip is a non-magnetic silicon AFM tip;

wherein said each of said nanoparticles comprises an outer coating layer encapsulating each nanoparticle, wherein said outer coating layer comprises an organic layer, wherein said nanoparticles having a diameter ranging from 2 nm to 20 nm, and said organic layer having a thickness ranging from 0.5 nm to 5 nm, wherein said outer coating layer comprises an organic coat comprising a head-group and a tail-group;

wherein said head group comprises one of an amine, carboxylic acid, isocyanide, nitrile, phosphene, phosphonic acid, sulfonic acid, thiol, and trichlorosilane;

wherein said tail-group comprises one of an alkyl chain, aryl chain, fluorocarbon, siloxane, fluorophore, DNA, carbohydrate, and protein, wherein said tip is coated with an adhesion layer, wherein said adhesion layer is between said tip and said nanoparticles, wherein said nanoparticles are generally spherical, wherein said adhesion layer comprises one of n-(2-aminoethyl)3-aminopropyl-trimethoxysilane, polyethylineimine, polymethylmethacrylate, epoxy, cyanoacrylate adhesive, and an α,ω alkyl chain, wherein said layer of chemically-synthesized nanoparticles is a single layer of nanoparticles thick and covers only the apex of said tip, wherein said layer of chemically-synthesized nanoparticles is at least one nanoparticle thick, and wherein said solvent comprises any of toluene, heptane, pentane, chloroform, and dichloromethane.

33. The tip of claim 32, wherein said scanning probe microscope tip is one of an atomic force microscope tip, a near-field scanning optical microscope tip, and a scanning tunneling microscope tip.

34. The tip of claim 32, wherein said nanoparticles comprise at least one of an amorphous, crystalline, ferromagnetic, paramagnetic, superparamagnetic, antiferromagnetic, ferrimagnetic, magneto optic, ferroelectric, piezoelectric, superconducting, semiconducting, magnetically-doped semiconducting, insulating, fluorescent, and chemically catalytic nanoparticles.

35. The tip of claim 32, wherein said layer of chemically-synthesized nanoparticles comprises a single nanoparticle affixed to an apex of said tip.

36. A scanning probe microscope tip consisting of:

coating said tip with a layer of chemically-synthesized generally spherical nanoparticles affixed to said tip such that a drop of solvent containing said nanoparticles is deposited onto a surface of a liquid subphase prior to said nanoparticles being affixed to said tip, each of said nanoparticles comprising a length and width, wherein said length differs from said width by less than approximately 15%, wherein said tip is a non-magnetic silicon AFM tip;

wherein said each of said nanoparticles comprises an outer coating layer encapsulating each nanoparticle, wherein said tip is coated with an adhesion layer, wherein said adhesion layer is between said tip and said nanoparticles, wherein said adhesion layer comprises one of n-(2-aminoethyl)3-aminopropyl-trimethoxysilane, polyethylineimine, polymethylmethacrylate, epoxy, cyanoacrylate adhesive, and an α,ω alkyl chain, wherein said layer of chemically-synthesized nanoparticles is at least one nanoparticle thick, and wherein said solvent comprises any of toluene, heptane, pentane, chloroform, and dichloromethane.

* * * * *